Feb. 7, 1928. 1,658,056
G. H. PHELPS ET AL
ELECTRIC PRESSING OR FORGING MACHINE
Filed April 20, 1923 5 Sheets-Sheet 4
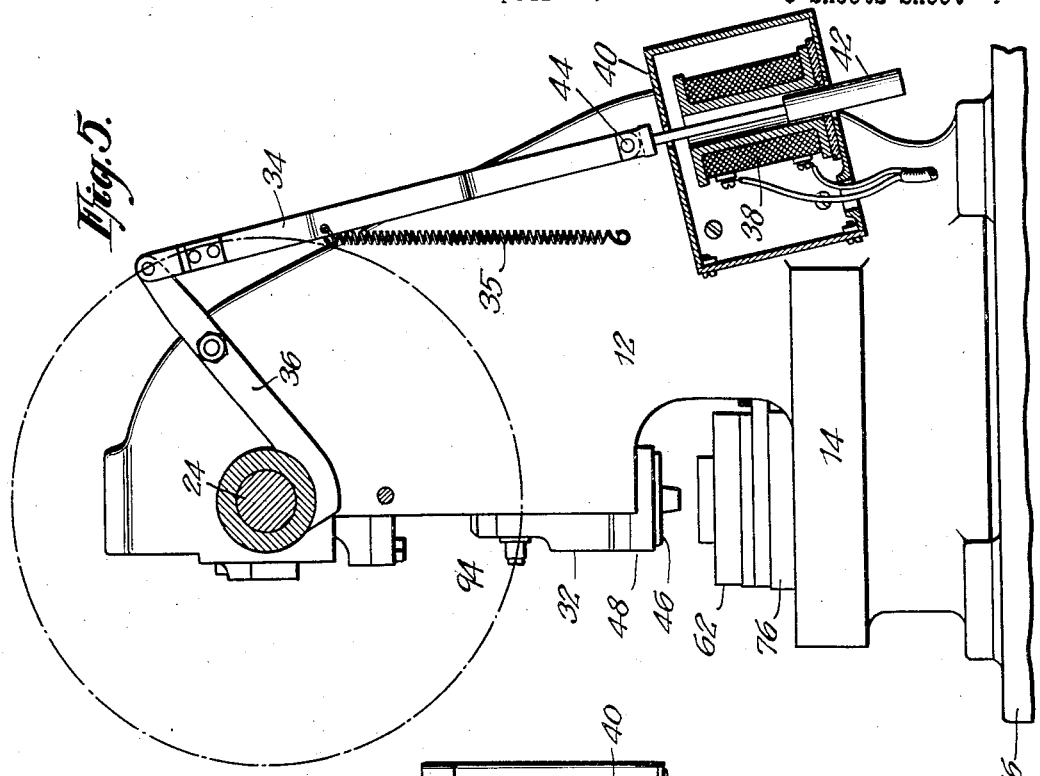
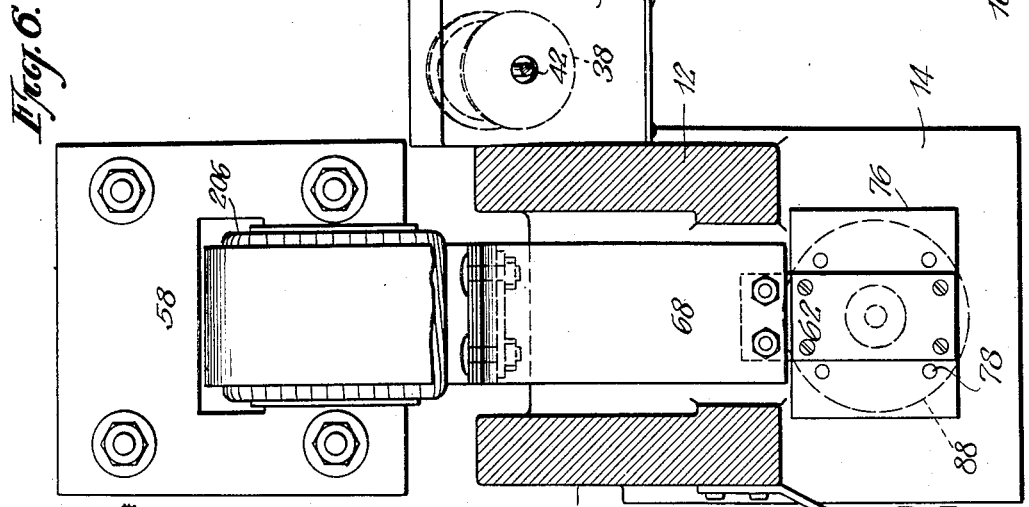
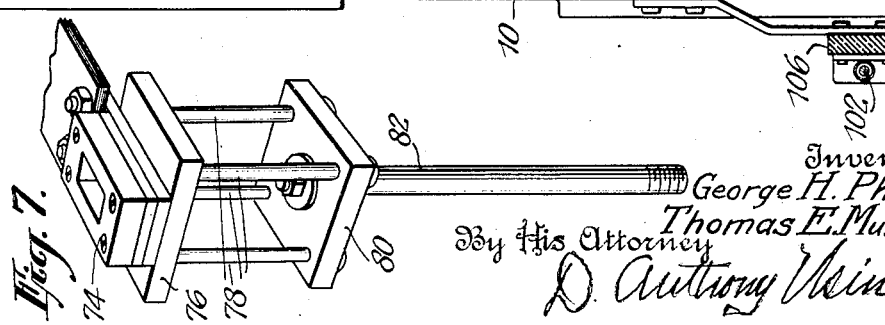
Inventors
George H. Phelps.
Thomas E. Murray, Jr.
By His Attorney
D. Anthony Usina Feb. 7, 1928.

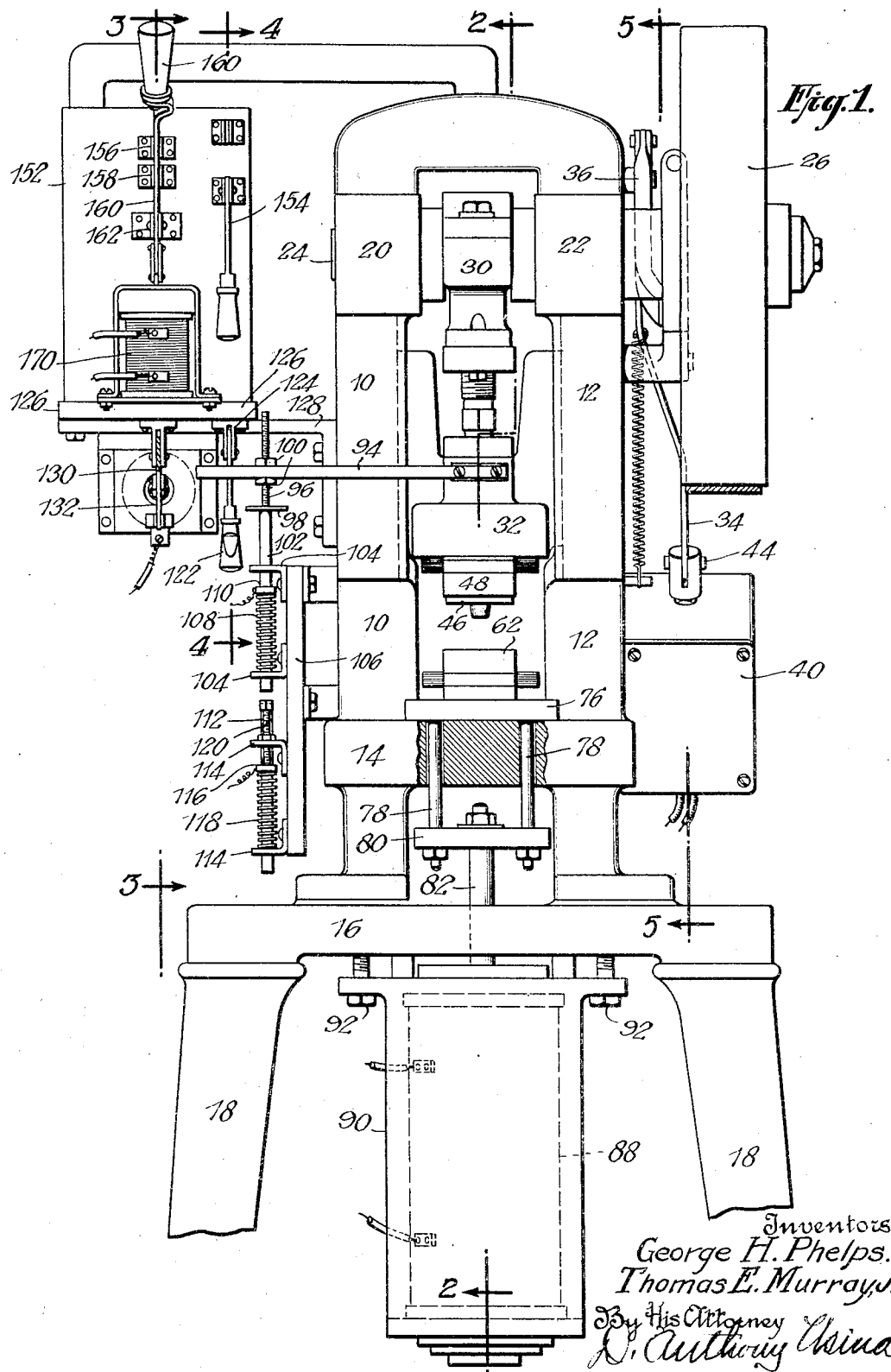

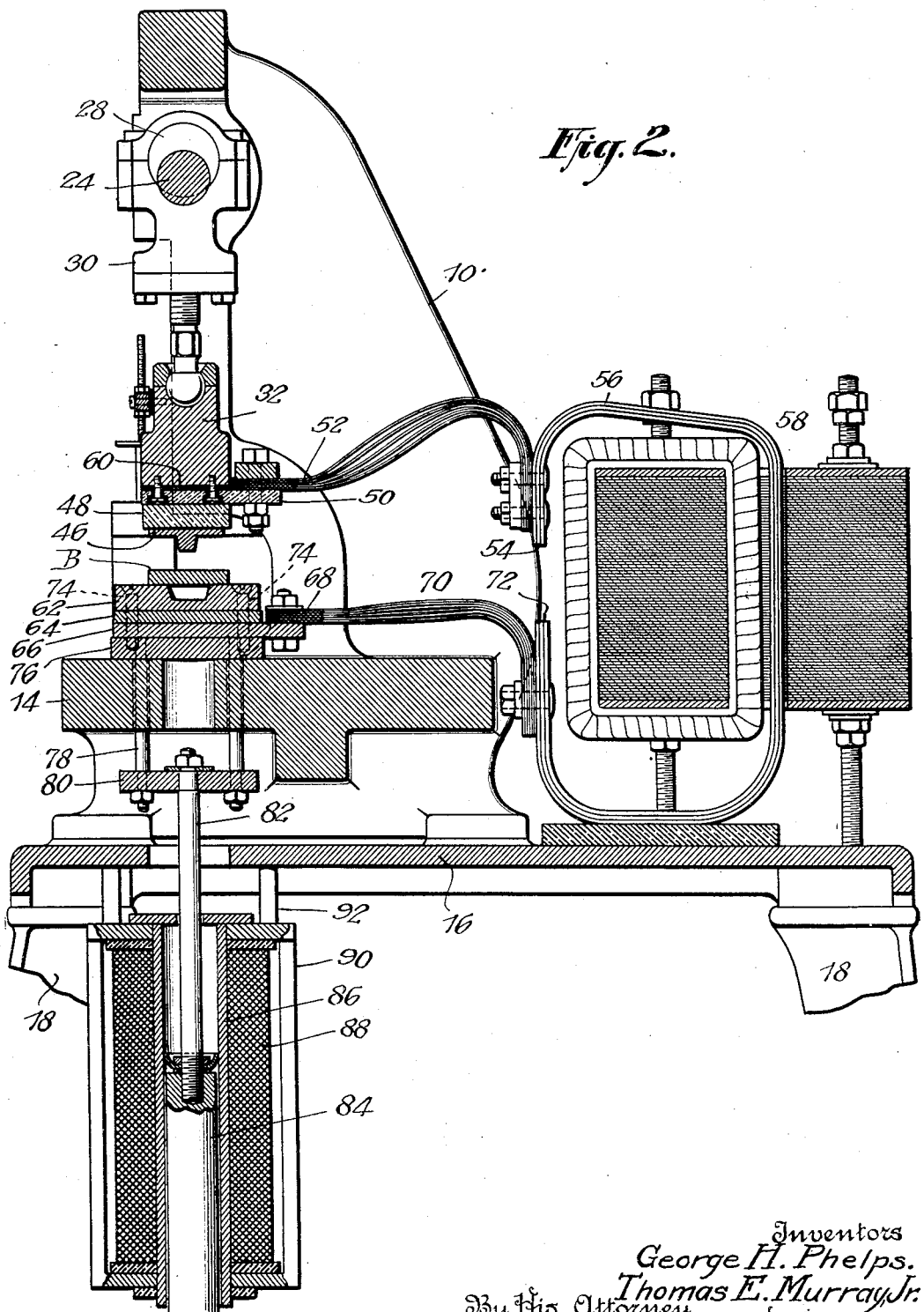

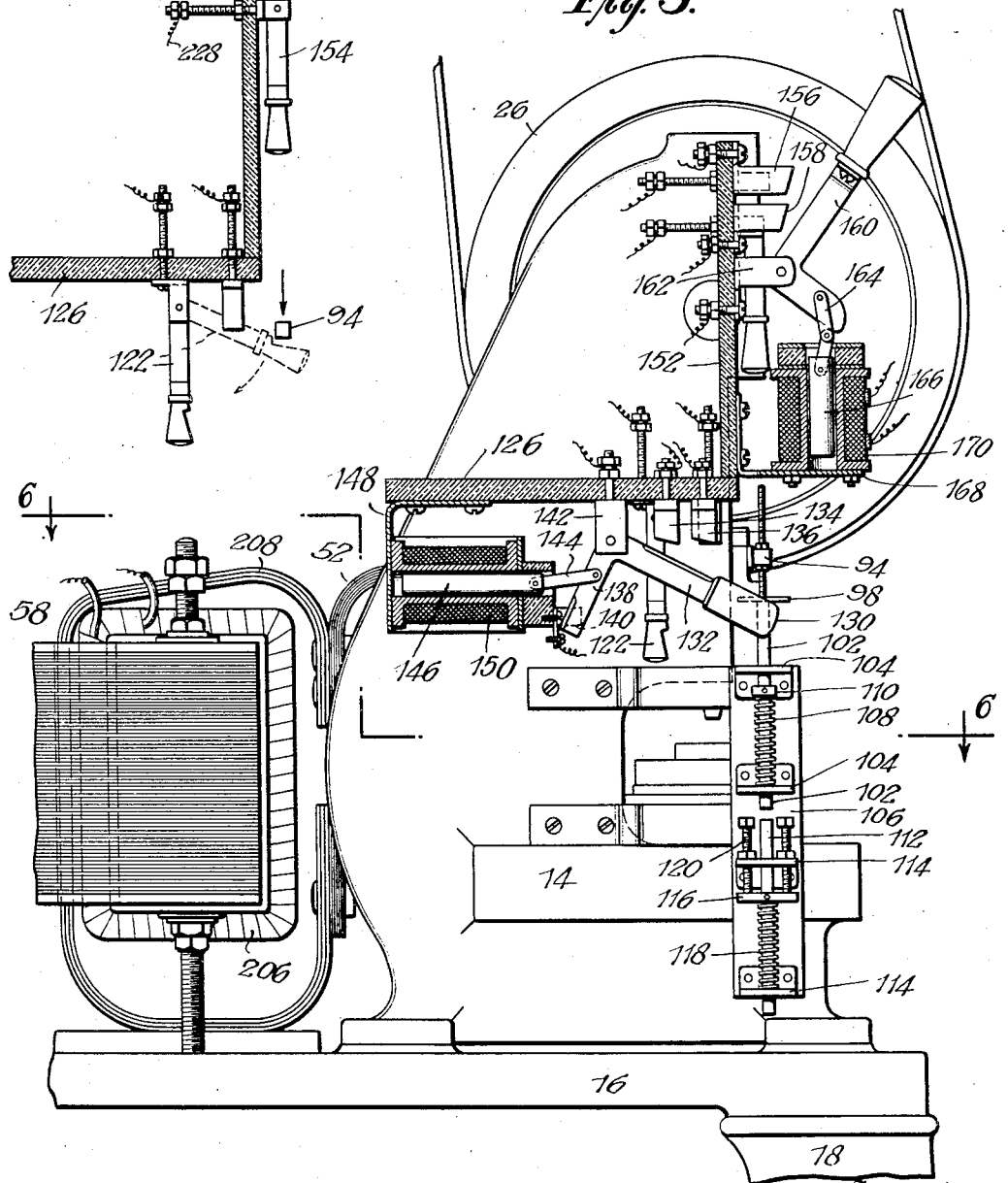

G. H. PHELPS ET AL 1,658,056

ELECTRIC PRESSING OR FORGING MACHINE

Filed April 20, 1923    5 Sheets-Sheet 5

Inventors
George H. Phelps.
Thomas E. Murray Jr.
By His Attorney
D. Anthony Usina Patented Feb. 7, 1928.

1,658,056

UNITED STATES PATENT OFFICE.

GEORGE H. PHELPS, OF WAREHOUSE POINT, CONNECTICUT, AND THOMAS E. MURRAY, JR., OF BROOKLYN, NEW YORK; SAID PHELPS ASSIGNOR TO SAID MURRAY.

ELECTRIC PRESSING OR FORGING MACHINE.

Application filed April 20, 1923. Serial No. 633,378.

This invention relates to presses for making forgings and pressed metal articles and is applicable also to means for extruding softened metal as in die casting, etc. In the machine shown the work is softened or made plastic by passing an electric current through the work and the machine is so arranged that the heating current is automatically controlled so that the interval of time for which current passes through the work, or the amount of electrical energy consumed, is not dependent upon the skill of the operator.

The invention provides means for producing uniform forgings or pressed pieces at a high rate of speed and the arrangement is such that the heating current applied to each piece is practically the same and each work piece is subjected to pressure and to the action of the same amount of energy, and consequently to the application of the current for the same length of time.

In the accompanying drawings which illustrate an embodiment of the invention,

Fig. 1 is a front elevation illustrating a power press and showing means for lifting the lower die, and various control switches and mechanism for operating the same;

Fig. 2 is a longitudinal section on line 2—2 of Fig. 1 showing the solenoid for lifting the die, the welding transformer and the press actuated die;

Fig. 3 is a section on line 3—3 of Fig. 1 showing certain control switches mounted on the side frame of the press;

Fig. 4 is a detail section on line 4—4 of Fig. 1;

Fig. 5 is a section on line 5—5 of Fig. 1 showing a solenoid for tripping the one-revolution clutch of the press.

Fig. 6 is a horizontal section on the line 6—6 of Fig. 3;

Fig. 7 is a detail perspective view showing the mounting for the lower work-supporting die;

Figure 8:
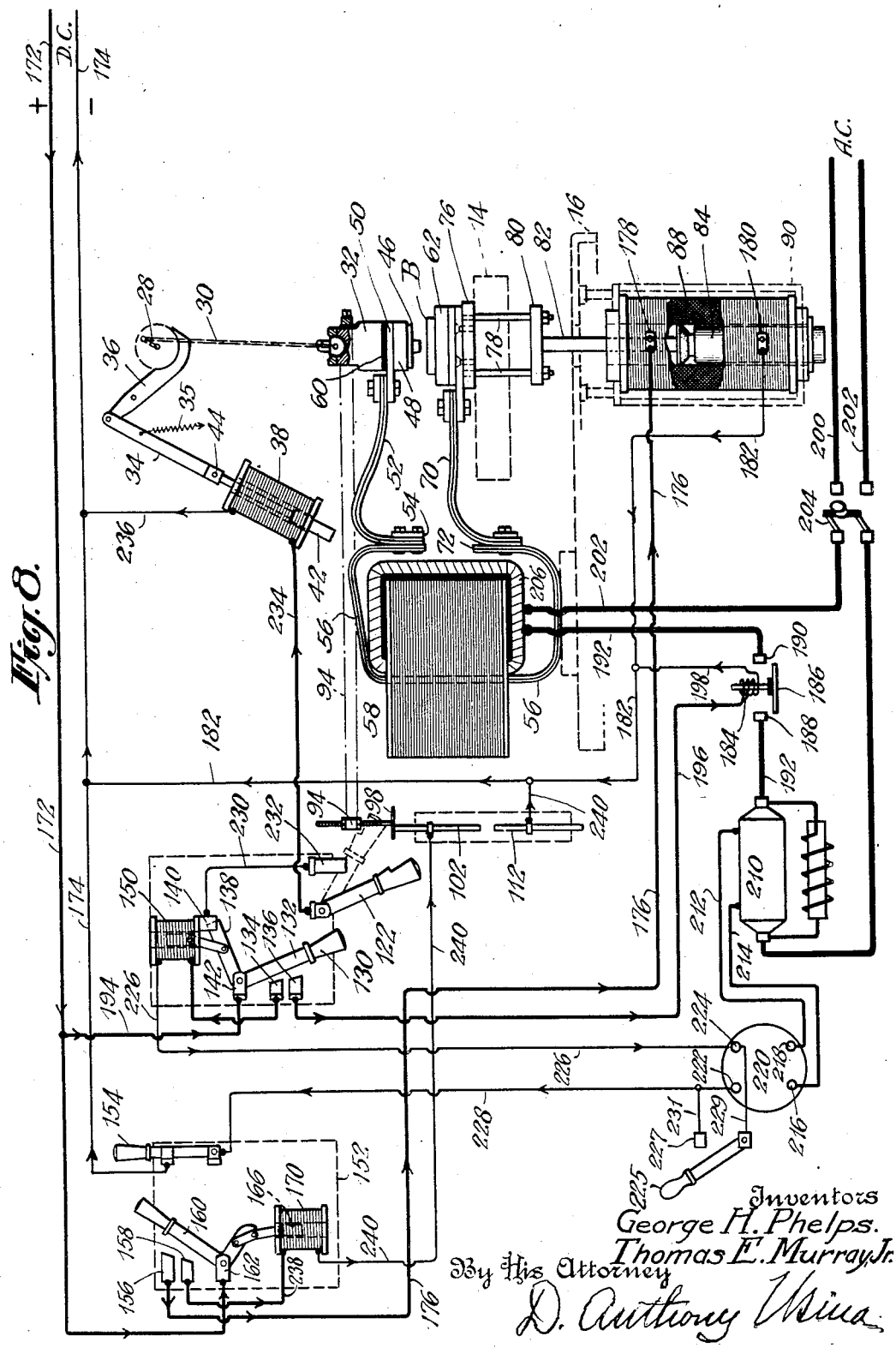
Fig. 8 is a circuit diagram showing conventionally operating parts of the press and other apparatus for controlling the operations thereof.

Referring to Figs. 1 to 7, the press comprises upright side frames 10 and 12 which are integrally connected by a platen 14, the press being supported on a base 16 carried by suitable legs 18. Mounted in suitable bearings 20 and 22 carried by the frames 10 and 12 is the drive shaft 24 on which is loosely mounted the belt driven fly wheel 26. The shaft 24 carries an eccentric or crank 28 which through the connecting rod 30 reciprocates a cross-head 32 guided in suitable ways formed in the side frames 10 and 12. The shaft 24 is provided with a one-revolution clutch of known construction and this clutch is so arranged that when link 34, Figs. 1 and 5, is pulled up a lever 36 will co-operate with a clutch dog, not shown, in such a way that the fly wheel 26 will turn the shaft 24 through one revolution. This one-revolution clutch is not illustrated in detail as it is a form of clutch commonly used for punch presses. It is only necessary to state in passing, that as long as the lever 36 and link 34 are in the position shown, the shaft 24 will remain out of driving engagement with the fly wheel 26, and that these parts will be held in driving engagement for one revolution after the link 34 is lifted.

The link 34 is actuated by a solenoid 38 mounted in a casing 40 secured to the side frame 12, said solenoid having a core 42 which is connected at 44 with the link 34. The circuit of the solenoid 38 is controlled by means to be hereinafter set forth.

The cross-head 32 carries the upper die 46 which is secured by suitable means to a plate 48 electrically connected to a bar 50 which in turn has clamped thereto the laminated conductor 52 leading to one end 54 of the secondary winding 56 of an alternating current transformer 58. The die 46 and plates 48 and 50 are insulated from the cross-head 32 by a slab of dielectric material 60.

The lower die 62 is connected electrically with plates 64 and 66, the latter being connected at 68 with the laminated conductor 70 leading to the opposite terminal 72 of the secondary winding of the transformer 58.

The plates 62, 64 and 66 are secured by screws 74 to a plate 76 which is supported by four upright rods 78, Fig. 7, which are secured to a plate 80 carried on the end of a rod 82 which in turn is secured to the movable core 84 operating within the shell 86 of a solenoid 88 carried in a suitable yoke or casing 90 which is secured by screws 92 to the underside of the base 16. As thus arranged it is clear that when the solenoid 88 is energized the plate 76 and the die 62 carried thereby will be lifted.

The cross head 32 carries a laterally extending insulated bar 94 which carries near its outer end a threaded rod 96 having a head 98 secured to its lower end. The position of the head relatively to the bar can be adjusted by turning the rod 96 and clamping the lock nuts 100 as will be understood. The head 98 moves down with the cross-head 32 and in so doing pushes a contact member 102 which is slidingly mounted in brackets 104 carried by switch panel 106 secured to the frame 10. The switch member 102 carries a compression spring 108 which bears against a collar 110 at one end and at the lower end against the bracket 104. When the cross-head approaches the end of its downward stroke the rod 102 makes contact with a yieldingly arranged rod 112 guided in brackets 114 carried by the panel 106. The rod 112 carries a collar 116 against which impings a compression spring 118, and adjusting screws 120 (see Fig. 3) are provided for regulating the position of the contact rod 112. When the rods 102 and 112 make contact they close a circuit through a solenoid, to be hereinafter referred to, and cause the opening movement of a switch which has formerly been manually closed as will hereinafter appear.

The end of the bar 94 extends into the path of a switch 122 pivoted on a switch bracket 124 secured to the underside of a switch panel 126 carried on a bracket 128 bolted to the side frame 10 of the press. The downward movement of this bar 94 moves said switch 122 to open position thus breaking a circuit which has previously been made as will hereinafter appear.

The panel 126 carries a switch 130 having a blade 132 adapted to engage contacts 134 and 136, and a blade 138 adapted to engage a contact 140, the switch being pivoted to a terminal bracket 142. The blade 138 of the switch 130 is connected by a link 144 with the movable core 146 of a solenoid 150 which is carried by a bracket 148 secured to the panel 126. This solenoid is capable of breaking the connection of the blade 132 with the contacts 134 and 136 and making the connection between blade 138 and contact 140 as hereinafter set forth.

A switch panel 152 carries a manually operated switch 154 and another switch 160 which is adapted to be manually operated in one direction to close certain circuits and automatically operated in the opposite direction to break such circuits. This switch in its closed position makes contact with the terminals 156 and 158. The switch 160 is pivoted on a terminal bracket 162 and said switch carries an arm which is connected by links 164 with the movable core 166 of a solenoid 170 which is carried by a bracket 168 secured to the panel 152. The solenoid 170 when energized, as hereinafter set forth, pulls down the core 166 and breaks contact between the switch blade 160 and the contacts 156 and 158.

The operation will be described fully in connection with Fig. 8. But briefly stated, assuming the fly wheel 26 to be revolving, the operator places a blank B on top of the die 62. He then closes the switch 160 which causes the solenoid 88 to be energized thus lifting the work into engagement with the upper die 46 carried by the cross-head 32, so that when the heating current is applied it can pass from the die 46 and through the work to the die 62. The operator then closes switches 130 and 122 which control circuits whereby the heating current is applied to the work automatically for a determined interval and then cut off, and the one-revolution clutch is tripped thereby causing the downward movement of the pressing die 46 while the work is in its softened condition. Toward the end of the downward movement of the cross-head 32, the contacts 102 and 112 come into play and energize the solenoid 170 which cuts off the current from the solenoid 88. The bar 94 strikes the switch 122 and cuts off current from the clutch trip solenoid 38 shortly after the downward movement begins.

Referring now in detail to Fig. 8, assuming that a blank B has been placed on the die 62 and that the fly wheel 26 is revolving freely on the shaft 24, and the various switches are in the position shown in full lines, Fig. 8; the operator closes switches 160, 130 and 122 in the order stated. These are the only manual operations necessary and the circuit arrangements are such that these switches are automatically opened after one cycle of operation to restore the parts to starting position.

As shown in the drawings various controlling devices are actuated by direct current and the heating is by alternating current. The A. C. power line is shown by the heaviest lines on the drawing and for ease in following the circuits the positive D. C. power lines are shown by lines of medium thickness, and the negative D. C. lines are shown as fainter lines. The positive D. C. feeder is shown at 172 and the negative feeder D. C. line at 174. These supply current for most of the controlling apparatus. On closing the switch 160 a circuit is made through the solenoid 88 thus energizing the same and lifting the die 62 so as to move the blank B into contact with the upper die 46. This circuit is from wire 172 through switch bracket 162 and switch blade 160, contact 156 by wire 176 to terminal 178 of the solenoid 88 and out through terminal 180 and by wire 182 to the negative feed wire 174.

The closing of switch 130 energizes a coil 184 which lifts the pop switch 186 making contact between the terminals 188 and 190 located in the A. C. line 192. On closing the switch 130 a circuit is made through the coil 184 from positive lead 172, wire 194, switch bracket 142, switch blade 132, contact 136, wire 196 through the coil 184 and back to the negative line 174 by way of wires 198 and 182. Closing the switch 186 completes a circuit through the A. C. feed wires 200 and 202, the service switch 204 being normally closed. The primary winding 206 of the transformer 58 is thus excited and causes a current of high amperage and low voltage to flow through the leads 52 and 70 connected with the secondary 56 of the transformer, the current of course flowing through the dies 46 and 62 and the blank B thus softening the blank. The closing of the pop switch 186 causes a current to flow through the current transformer 210. Wires 212 and 214 connect this transformer with terminals 216 and 218 of a time relay of known construction. When current is supplied to the terminals 216 and 218, the time relay 220 turns or moves at a governed rate and after the lapse of a predetermined time interval this relay causes a circuit to be closed across the contacts 222 and 224. This relay is adjusted so as to allow time for the alternating current to properly heat or soften the blank to enable the dies to press the blank to the required shape. When the relay contacts 222 and 224 come together they complete a circuit from positive wire 172, wire 194, switch bracket 142, switch blade 132, contact 134, solenoid 150, wire 226, relay contacts 224 and 222, wire 228, switch 154 back to the negative line 174. This energizes the trip solenoid 150 and causes the blade 132 of the switch 130 to be disengaged from the contacts 134 and 136, and the blade 138 to make contact with the terminal 140. This opening movement of the blade 132 de-energizes coil 184 of the pop switch and automatically breaks the A. C. primary circuit through the transformer 58 and thus cuts off the heating current.

Closing the circuit between the switch terminal 142 and terminal 140, closes a circuit through the solenoid 38 thus energizing the same and causing the movement of the link 34 which trips the one-revolution clutch of the press and permits the fly wheel to turn the shaft 24. The circuit of the solenoid 38 is from positive wire 172, wire 194, switch terminals 142 and 140, wire 230, switch terminal 232, switch 122, wire 234 through the solenoid 38 and wire 236 to the negative feed wire 174.

Tripping the clutch causes the cross-head 32 to descend, thus causing the upper die 46 to be pressed firmly against the blank B and further movement carries the lower die 62 downward until its supporting plate 76 strikes the platen 14 of the press bed. At this point of the cross-head's travel, head 98 carried by the arm 94 causes the contact rod 102 to engage the similar rod 112 which action results in closing a circuit through the solenoid 170. This pulls down the core 166 and disengages the switch 160 from the contacts 156 and 158 thereby breaking the circuits previously made. The circuit of solenoid 170 is from positive line 172, switch bracket 162, switch 160, contact 158, wire 238, solenoid 170, wire 240, switch rods 102 and 112, wire 240 and wire 182 to the negative feed wire 174. Opening the switch 160 de-energizes the solenoid 88 and thus releases the lower die 62 in its normal starting position as will be understood.

As the press cross-head 32 descends, the bar 94 strikes the switch 122 and breaks contact with the terminal 232 thereby de-energizing the solenoid 38 and permitting the spring 35 to pull the link 34 and trip-lever 36 back to normal position. The press cross-head continues its descent and the upper die 46 co-operating with the lower die 62 shapes the blank B to the contour determined by the design of the dies. The press cross-head rises to the upper position and the finished forging or pressing is removed.

We have shown a switch 225 and a contact 227 and wires 229 and 231 whereby the circuit may be manually closed across the contacts 222 and 224 instead of by the automatic operation of the time relay 220. This manual switch 225 is merely an auxiliary adjunct and is used only in initially heating the dies to the required temperature before setting the machine for automatic control.

In heating the dies by manual control, preparatory to setting the machine for automatic operation, the switch 154 is manually opened and the switch 225 closed. The operator then uses the switch 154 to manually control the heating of the dies. When the dies have reached their proper working temperatures, the operator changes to automatic control by opening switch 225 and closing switch 154, and these switches remain in such positions (as shown in Fig. 8) throughout the period of automatic operation. The switches 154 and 225 are manipulated for example only at the beginning of a batch of work or at the start of a day's work.

It is clear that the only manual operations necessary are the closing of the three switches 160, 130 and 122. From the description it is apparent that the blank is first lifted to position where heating current can be passed therethrough and that the heating current through the work blank is automatically applied for a predetermined length of time; and further that the several parts are restored to their normal positions upon the completion of each piece of work.

Machines of this general class has been known for some time, as illustrated, for example, in the Murray Patent 1,320,895 of November 4, 1919, in which one die has been fixed during the operation and the other die has been operated in two stages, first moving it down to engage the work on the lower die and cause the passage of the welding current, and then moving it to a completion of its stroke to press the work to shape. The present invention simplifies the machine by using one (the lower in the illustrated machine) die for the first operation, moving it up to bring the work into contact with the upper die and cause the passage of the heating current, and the other to take its full stroke to serve the pressing operation only. The operation of the upper die is thus simplified to an ordinary straight stroke down and then up in the way familiar in one-revolution presses. The mechanism is simplified and the operation is rendered more certain and accurate by apportioning to each of the dies one simple movement.

The apparatus permits forgings or pressed work to be made in quantities absolutely uniform in all respects at a very high rate of speed and at the present state of development the work can be turned out at the rate of approximately 600 pieces per hour.

Working at a high rate of speed the value of automatically controlling the length of time that the heating current passes through the work, will be appreciated by those skilled in the art, it being evident that such automatic control permits the production of articles which are formed under identical conditions and are therefore uniform in all respects.

The dies may themselves form the electrodes or they may carry separate electrodes and the current may be applied to the work in various other ways than that described. The time relation of the application of the current and pressure may be varied to suit practical requirements. They may both be applied at the same time and both be cut off at the same time by suitably setting or adjusting the various parts. Or both current and pressure may be applied at the same time and the current cut off before the pressure.

The present invention is in part a division of our application, Serial No. 522,480, filed December 15, 1921, and the apparatus herein disclosed is well adapted for use in carrying out the method disclosed in said previous application.

The term die used herein is intended to include a mold or any other form of device in which either softened, plastic or molten metal can be pressed to a desired shape.

It is to be understood that although the operation of the machine has been described with reference to applying heat and pressure to a work blank to soften and shape it, the apparatus can also be used to control the application of current and pressure to electrically weld separate pieces to each other.

The term "one-revolution clutch" is used herein the commonly accepted sense of a clutch which starts the operation of the press and causes its operation through a determined cycle of one or more revolutions at the end of which the clutch is automatically disengaged. The invention is applicable also to a great variety of presses including those using compound dies of which one part is advanced to hold the work at certain points before the advance of another part or parts which complete the forming of the work.

Though we have described with great particularity of detail certain embodiments of our invention, yet it is not to be understood therefrom that the invention is restricted to the particular embodiments disclosed. Various modifications may be made by those skilled in the art without departure from the invention as defined in the following claims.

What we claim is:

1. A machine of the class described including in combination a power-operated press, means for applying a heating current to the work while in position to be pressed and means controlled by the heating current for applying power to the press after the application of the heating current.

2. A machine of the class described including in combination a power-operated press, means for applying a heating current to the work while in position to be pressed and means controlled by the heating current for cutting off such current and for applying power to the press after the application of the heating current.

3. A machine of the class described including in combination a power-operated press, means for applying a heating current to the work while in position to be pressed and means controlled by the heating current for cutting off such current and for applying power to the press after the application of the heating current and means for automatically rendering said starting means inoperative until the heating current is again applied.

4. A machine of the class described including in combination a power-operated press, a switch, means actuated by said switch in one position to cause the passage of a heating current through the work while in position to be pressed and means actuated by said switch in another position to cause the operation of the press.

5. A machine of the class described including in combination a power-operated press, a switch, means actuated by said switch in one position to cause the passage of a heating current through the work and means actuated by said switch in another position to cause the operation of the press and mechanism controlled by the heating current to shift said switch from the first to the second position.

6. A machine of the class described including in combination a power-operated press, means for applying a heating current to the work and means controlled by the heating current for starting the operation and means for preventing the operation of the press when the heating current is applied.

7. A machine of the class described including in combination a power-operated press, means for electrically heating the work while in position to be pressed and means for automatically starting the pressing operation after the heating current has been interrupted.

8. A machine of the class described including in combination a power-operated press, a pair of opposed forming dies in the heating circuit, power driven means for actuating one of said dies, and electro-magnetic means for moving the other die to initially engage the work between the dies and cause the passing of a heating current through the work.

9. A machine of the class described including in combination a power-operated press, a pair of opposed forming dies, in the heating circuit power driven means for actuating one of said dies, electro-magnetic means for moving the other die to initially engage the work between the dies and cause the passing of a heating current through the work and means for automatically starting the movement of the pressing die.

10. A machine of the class described including in combination a power-operated press, a pair of opposed forming dies, in the heating circuit, power driven means for actuating one of said dies, electro-magnetic means for moving the other die to initially engage the work between the dies and cause the passing of a heating current through the work, means for automatically cutting off the heating current after the lapse of a predetermined brief interval and means for starting the movement of the pressing die.

11. A press carrying a pair of dies which are electrically connected to a heating circuit, a shaft for reciprocating one of said dies, a one-revolution clutch for causing the rotation of said shaft to operate its die and restore the latter to its starting position and means for bringing the dies together with the work between them to pass a current through the latter and means for thereafter actuating said clutch.

12. A press carrying a pair of dies which are electrically connected to a heating circuit, a shaft for reciprocating a first one of said dies, a one-revolution clutch for causing the rotation of said shaft to operate the said first die and restore the latter to its starting position, means for pressing the second die against the first, with the work between them, to cause the passage of a current through the work, said means adapted to yield during part of the movement of the first die and then to remain stationary and cause the pressing of the work.

13. A press carrying a pair of dies which are electrically connected to a heating circuit, a shaft for reciprocating one of said dies, a one-revolution clutch for causing the rotation of said shaft to operate its die and restore the latter to its starting position, an electro-motive device adapted to press the second die against the first with the work between them to cause the passage of a current through the work and to yield during a part of the forward movement of the first die.

14. A press carrying a pair of dies which are electrically connected to a heating circuit, a shaft for reciprocating one of said dies, a one-revolution clutch for causing the rotation of said shaft to operate its die and restore the latter to its starting position, means for moving the second die into engagement with the first with the work between them to cause the passage of a current through the work and means for tripping the one-revolution clutch to cause the forward movement of the first die.

15. A press carrying a pair of dies which are electrically connected to a heating circuit, a shaft for reciprocating one of said dies, a one-revolution clutch for causing the rotation of said shaft to operate its die and restore the latter to its starting position, an electro-motive device for moving the second die into engagement with the first with the work between them so as to cause the passage of a current, a switch for controlling said electro-motive device and a switch-controlled electro-motive device for tripping said one-revolution clutch to cause the forward movement of the first die.

16. A press, a one-revolution clutch for starting it, an electro-motive device for operating said clutch and means for breaking the circuit of said device automatically by the operation of the press.

17. A press including power-operated means for moving one die toward the other, an electro-motive device for moving the second die and the work toward the first and passing a heating current between the two dies and through the work and means actuated by the forward movement of the first die for breaking the heating circuit.

18. A press including a one-revolution clutch, an electro-motive device for actuating said clutch, a die which is advanced upon the operation of said clutch, a second die, an electro-motive device for advancing the second die to bring it into engagement with the first die with the work between them to pass a heating current between the dies and through the work, and means actuated by the advance of the first die for breaking the circuit through the clutch operating device and for breaking the circuit through the device for advancing the second die.

In witness whereof, we have hereunto signed our names.

GEORGE H. PHELPS.
THOMAS E. MURRAY, Jr.